(12) United States Patent
Chen et al.

(10) Patent No.: US 11,914,540 B2
(45) Date of Patent: Feb. 27, 2024

(54) ON-CHIP INTEGRATED CIRCUIT, DATA PROCESSING DEVICE, AND DATA PROCESSING METHOD

(71) Applicant: Lemon Inc., Grand Cayman (KY)

(72) Inventors: Yimin Chen, Los Angeles, CA (US);
Shan Lu, Los Angeles, CA (US);
Chuang Zhang, Los Angeles, CA (US);
Junmou Zhang, Los Angeles, CA (US); Yuanlin Cheng, Beijing (CN);
Jian Wang, Beijing (CN)

(73) Assignee: Lemon Inc., Grant Cayman (KY)

( * ) Notice: Subject to any disclaimer, the term of this patent is extended or adjusted under 35 U.S.C. 154(b) by 0 days.

(21) Appl. No.: 17/737,415

(22) Filed: May 5, 2022

(65) Prior Publication Data

US 2022/0358071 A1    Nov. 10, 2022

(30) Foreign Application Priority Data

May 7, 2021   (CN) .......................... 202110514490.7

(51) Int. Cl.
   *G06F 13/40*   (2006.01)
(52) U.S. Cl.
   CPC ...... *G06F 13/4027* (2013.01); *G06F 2213/40* (2013.01)
(58) Field of Classification Search
   CPC .................. G06F 13/4027; G06F 2213/40
   See application file for complete search history.

(56) References Cited

U.S. PATENT DOCUMENTS

| 2004/0041813 | A1* | 3/2004 | Kim | ...................... G06T 15/005 |
| | | | | 345/519 |
| 2009/0028326 | A1* | 1/2009 | Qi | .......................... G06F 9/3879 |
| | | | | 380/29 |
| 2011/0110435 | A1* | 5/2011 | Li | .......................... H04N 19/42 |
| | | | | 375/E7.026 |
| 2012/0254587 | A1* | 10/2012 | Biran | .................. G06F 13/4022 |
| | | | | 712/34 |
| 2012/0284446 | A1 | 11/2012 | Biran et al. | |
| 2017/0109801 | A1 | 4/2017 | Devendra et al. | |
| 2017/0293428 | A1 | 10/2017 | Radovanovic | |

(Continued)

FOREIGN PATENT DOCUMENTS

CN      1487475 A    4/2004
CN      103810133 A  5/2014
(Continued)

*Primary Examiner* — Nimesh G Patel
(74) *Attorney, Agent, or Firm* — Faegre Drinker Biddle & Reath LLP (57) ABSTRACT

An on-chip integrated circuit, a data processing device and a method are provided. The on-chip integrated circuit includes: a processor circuit and an accelerator circuit. The processor circuit includes a processor and a data storage area, the processor is connected to the data storage area through a first bus in the processor circuit. The accelerator circuit includes an accelerator and a second bus, the accelerator is connected to the second bus, and the second bus is bridged with the first bus corresponding to the data storage area, to perform data interaction between the accelerator and the data storage area, which can reduce the congestion on a bus of the processor and improve the quality of service of the application.

18 Claims, 4 Drawing Sheets

(56) References Cited

U.S. PATENT DOCUMENTS

2018/0285288 A1   10/2018  Bernat et al.
2019/0108145 A1*  4/2019  Raghava .............. G06F 13/1668
2022/0358078 A1*  11/2022  Chen ................... G06F 13/4068

FOREIGN PATENT DOCUMENTS

CN      107748794 A    3/2018
TW        I528280 B    4/2016

* cited by examiner

ON-CHIP INTEGRATED CIRCUIT, DATA PROCESSING DEVICE, AND DATA PROCESSING METHOD

The present application claims priority to Chinese Patent Application No. 202110514490.7, titled "ON-CHIP INTEGRATED CIRCUIT, DATA PROCESSING DEVICE, AND DATA PROCESSING METHOD", filed on May 7, 2021 with the National Intellectual Property Administration, PRC, which is incorporated herein by reference in its entirety.

FIELD

The present disclosure relates to the technical field of integrated circuits, and in particular to an on-chip integrated circuit, a data processing device, and a data processing method.

BACKGROUND

With the diversification requirements of data processing, the central processing unit (CPU) based on the von Neumann architecture has low data processing efficiency for some types of data processing, such as image data processing.

SUMMARY

This summary section is provided to introduce concepts in a simplified form, which will be described in detail in the following detailed description section. This summary section is not intended to identify key features or essential features of the claimed technical solution, nor is it intended to limit the scope of the claimed technical solution.

An on-chip integrated circuit, a data processing device, and a data processing method are provided according to embodiments of the present disclosure.

In a first aspect, an on-chip integrated circuit is provided according to an embodiment of the present disclosure, which includes a processor circuit and an accelerator circuit. The processor circuit includes a processor and a data storage area, and the processor is connected to the data storage area through a first bus. The accelerator circuit includes an accelerator and a second bus, the accelerator is connected to the second bus, and the second bus is bridged with the first bus corresponding to the data storage area, to perform data interaction between the accelerator and the data storage area.

In a second aspect, a data processing device is provided according to an embodiment of the present disclosure, which includes the on-chip integrated circuit in the first aspect. The on-chip integrated circuit includes a processor circuit and an accelerator circuit. The processor circuit includes a processor and a data storage area, the processor is connected to the data storage area through a first bus in the processor circuit. The accelerator circuit includes an accelerator and a second bus, the accelerator is connected to the second bus, and the second bus is bridged with the first bus corresponding to the data storage area, to perform data interaction between the accelerator and the data storage area.

In a third aspect, a data processing method is provided according to an embodiment of the present disclosure, which is applied to the on-chip integrated circuit in the first aspect. The method includes: determining, in response to receiving a data processing request, an address of data to be processed corresponding to the data processing request; sending the address to the accelerator circuit; accessing, by the accelerator through the second bus in the accelerator circuit, the data storage area to obtain the data to be processed from the data storage area, wherein the second bus is bridged with the data storage area; and transmitting, by the accelerator circuit, a calculation result of the accelerator to the data storage area through the second bus in the accelerator circuit.

BRIEF DESCRIPTION OF THE DRAWINGS

The above and other features, advantages of the embodiments of the present disclosure will become more apparent when taken in conjunction with the drawings and with reference to the following detailed description. Throughout the drawings, the same or similar reference numbers refer to the same or similar elements. It should be understood that the drawings are schematic and that the components and elements are not necessarily drawn to scale.

DETAILED DESCRIPTION OF EMBODIMENTS

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein, but rather are provided for the purpose of a more thorough and complete understanding of the present disclosure. It should be understood that the drawings and embodiments of the present disclosure are only for exemplary purposes, and are not intended to limit the protection scope of the present disclosure.

It should be understood that various steps described in method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof means inclusive, that is, "including but not limited to". The term "based on" means "based at least in part on." The term "an embodiment" means "at least one embodiment". The term "another embodiment" means "at least one another embodiment". The term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or more".

The names of messages or information exchanged between multiple devices in the embodiments of the present disclosure are only for illustrative purposes, and are not intended to limit the scope of these messages or information.

Figure 1:
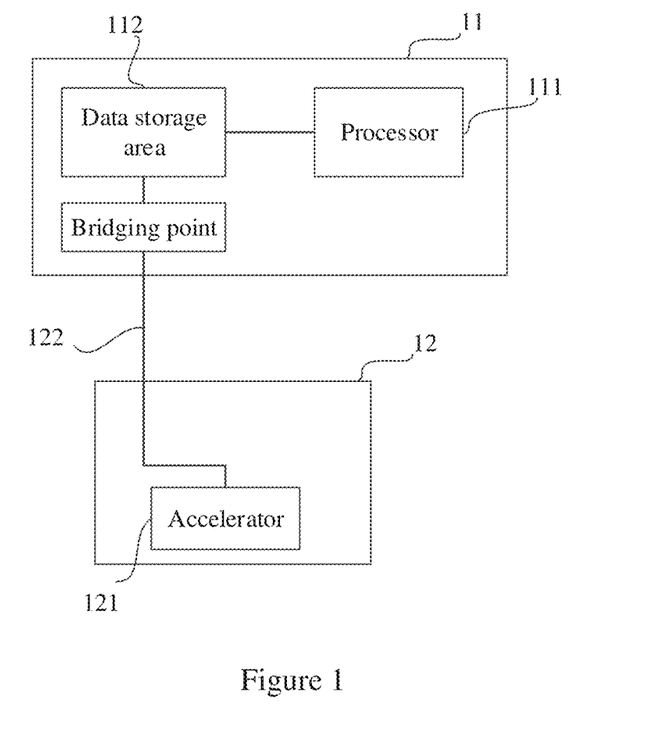
FIG. 1 is a schematic structural diagram of an on-chip integrated circuit according to an embodiment of the present disclosure.

Reference is made to FIG. 1, which is a schematic structural diagram of an on-chip integrated circuit according to the present disclosure. As shown in FIG. 1, the on-chip integrated circuit includes: a processor circuit 11 and an accelerator circuit 12 that are located on the same chip.

The processor circuit 11 includes a processor 111 and a data storage area 112, and the processor 111 is connected to the data storage area 112 through a first bus arranged in the processor circuit 11.

The accelerator circuit 12 includes an accelerator 121 and a second bus 122. The accelerator is connected with the second bus, and the second bus is bridged with the first bus corresponding to the data storage area, to perform data interaction between the accelerator and the data storage area.

The above-mentioned bridging refers to providing a bridge point at the first bus corresponding to the data storage area, and the second bus is connected to the bridge point to perform data access of the accelerator from the data storage area 112.

The second bus may have one of the following topologies: a ring topology, a mesh topology, and a star topology.

The second bus may comprise a cache coherent bus, or a non-cache coherent bus.

The processor here may be a general-purpose processor (that is, a central processing unit, CPU), a graphics processor, and the like. The above general-purpose processor may access the data storage area through the first bus.

The data storage area may include a cache, a dynamic random access memory (DRAM), and a static random access memory (SRAM).

The above-mentioned data storage area may have a storage area identifier, and the processor and the accelerator store data in the data storage area according to the storage area identifier, or read data from the data storage area according to the storage area identifier.

The data storage area may store a data processing result generated by the accelerator when processing data, or cache the data to be processed.

Since the accelerator is dedicated for data processing, such as image data processing, or processing of intermediate data for artificial intelligence, the data amount of calculation required by the accelerator is large, and the data amount of the calculation result of the accelerator is also large.

In order to improve the data processing capability of the integrated circuit, an accelerator dedicated to data processing is added to the chip where the processor is located, and the accelerator may share the first bus with the processor. Since the accelerator and the processor share the first bus, the accelerator is still limited by the first bus. Further, since the accelerator occupies a large bandwidth on the chip, it is easy to cause congestion of data transmission, resulting in problems of service quality.

In the embodiment, the accelerator is provided with buses, so that the accelerator can communicate with the data storage area through its own bus by means of bridging. In this way, the accelerator is no longer limited by the buses in the processor core, and effect on the processor will not be excessive when the accelerator accessing resources of the processor on the bus, thereby reducing the congestion on the bus of the processor, thus improving the service quality (QoS) of the application.

In some implementations of the embodiment, a dedicated data memory may be arranged in the accelerator circuit. The dedicated data memory may include, for example, a static random-access memory (SRAM). Data to be processed and intermediate processing results may be stored in the dedicated data memory. The data interaction between the accelerator and the dedicated data memory does not affect the data path of the processor circuit, so that the congestion of data on the processor bus can be further reduced, and the quality of service of the application can be further improved.

Figure 2:
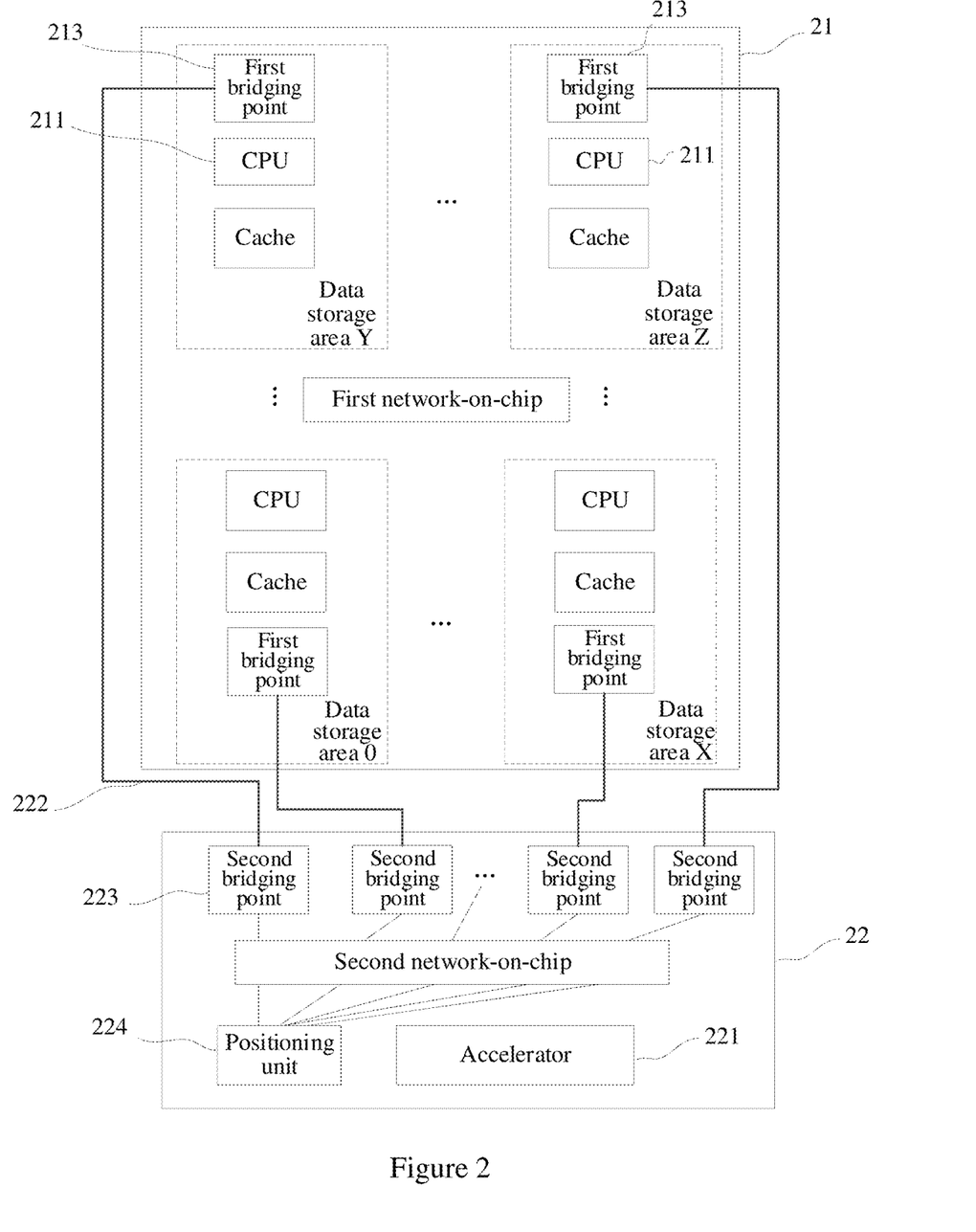
FIG. 2 is a schematic structural diagram of an on-chip integrated circuit according to another embodiment of the present disclosure.

Reference may be made to FIG. 2, which is a schematic structural diagram of an on-chip integrated circuit according to another embodiment of the present disclosure. Like the embodiment shown in FIG. 1, the on-chip integrated circuit shown in FIG. 2 includes a processor circuit 21 and an accelerator circuit 22. The processor circuit 21 includes a processor 211 and a data storage area, and the processor 211 is connected to the data storage area through a first bus arranged in the processor circuit 21. The accelerator circuit 22 includes an accelerator 221 and a second bus 222. The second bus 222 is bridged with the first bus corresponding to the data storage area, to perform data interaction between the accelerator 221 and the data storage area.

Different from the embodiment shown in FIG. 1, in the embodiment shown in FIG. 2, the processor circuit 21 includes multiple data storage areas and multiple first bridge points 213. The data storage area includes a data storage area 0, . . . , a data storage area X, a data storage area Y, and a data storage area Z, as shown in FIG. 2. The accelerator circuit also includes multiple second bridge points 223.

Each of the data storage areas corresponds to a first bridge point 213. There is a one-to-one correspondence between the first bridge points 213 and the second bridge points 223.

The second bridge point 223 is connected to a corresponding first bridge point 213 through a second bus 222.

Each of the data storage areas may have a storage area identifier. The storage area identifier may include numbers and characters. Alternatively, the storage area identifier may be a serial number of the data storage area that is composed of the numbers and characters. The processor 211 or the accelerator 221 may access the data storage area according to the storage area identifier of the data storage area.

By providing the second bridge point 223 corresponding to the first bridge point 213, the accelerator 221 may determine the second bridge point 223 connected thereto according to the data storage area to be accessed, facilitating the accelerator 221 to access different data storage areas.

It should be noted that the data storage area may include data storage units such as a cache, a dynamic random access memory (DRAM), and a static random access memory (SRAM). Each data storage unit may include multiple physical storage spaces.

The data to be processed that is sent to the processor 211 may usually include an address of the data to be processed. The processor 211 may determine a target storage area identifier by using a first preset hash function according to the address of the data to be processed, and access a target data storage area corresponding to the target storage area identifier according to the target storage area identifier.

In some implementations of this embodiment, the processor circuit 21 may include multiple processors 211. Each data storage area may be accessed by at least one processor 211.

In the implementations, multiple processors 211 may perform cooperative operation through the first bus. Each processor may cache data in the data storage area.

In the implementations, a first network-on-chip (NoC) may be formed through the first bus. The first network-on-chip may include multiple data channels. The multiple data storage areas are connected to each other through the data channels in the first network-on-chip.

In some implementations, the first bridge point 213 has a first identifier, and the second bridge point 223 has a second identifier. The first identifier of the first bridge point 213 and the second identifier of the second bridge point 223 may be mapped to the storage area identifier of the data storage area corresponding to the first bridge point 213 based on a preset mapping relationship. The first identifier includes numbers and characters. The first identifier is used to distinguish a first bridge point from others. The second identifier is used to distinguish a second bridge point from others.

In the implementations, the accelerator circuit 22 further includes a positioning unit 224. The positioning unit 224 is configured to determine a target storage area identifier according to an address of data to be processed, and determine the target first bridge point 213 and the target second bridge point 223 according to the target storage area identifier. Further, the accelerator 221 performs data interaction with a target storage area corresponding to the target storage area identifier according to the target second bridge point, the target first bridge point and the second bus 222 therebetween.

In some application scenarios, the positioning unit 224 may be provided with a second preset hash function. The positioning unit 224 may calculate the target storage area identifier by using the second preset hash function according to the address of the data to be processed.

In an alternative implementation, a length of a target path for accessing the target data storage area through the target first bridge point and the target second bridge point is smaller than that for accessing the target storage area through another first bridge point and another second bridge point.

The path may include the first bridge point 213, the second bridge point 223, and a data channel inside the processor circuit.

As schematically illustrated, for the target data storage area Y, there are two paths to the target data storage area, that is, a first path from a first bridge point a to a second bridge point a', and a second path from a first bridge point b to a second bridge point b' and through a data channel d in the processor circuit. The first path is shorter than the second path.

The first path from the first bridge point a to the second bridge point a' may be used as the target path. The first bridge point a serve as the target first bridge point, and the second bridge point a' serves as the target second bridge point.

In the application scenarios, the accelerator 221 accesses the target data storage area through the shortest path for data access, which can reduce the number of nodes used for data transmission, thereby improving the speed of data interaction between the accelerator and the target data storage area, and avoiding the channel congestion caused by using the data channel in the processor circuit.

In some other application scenarios, the time duration for the accelerator 221 to access the target data storage area through the target first bridge point and the target second bridge point is shorter than a time duration for the accelerator 221 to access the target data storage area through another first bridge point and another second bridge point.

In a case of no data congestion, the first bridge point and the second bridge point in the shortest path between the accelerator 221 and the target data storage area are usually respectively the same as the first bridge point and the second bridge point in the shortest time duration for the accelerator to access the target data storage area.

In the application scenarios, in a case that a path between the original first bridge point and second bridge point used for data interaction between the accelerator 221 and the target data storage area is congested, the positioning unit may re-determine a target first bridge point and a target second bridge point, so that a new path between the target first bridge point and the target second bridge point is formed to bypasses the congested path for data transmission. Therefore, the data interaction between the accelerator and the target data storage area can be performed normally.

In some implementations, the accelerator circuit 221 includes a second network-on-chip. The second network-on-chip includes multiple second data channels. Each second bridge point is connected to a data channel.

In the implementations, when information interaction is required with a data storage area, the accelerator is connected with a data channel corresponding to a second bridge point for accessing the data storage area through a gate.

Through the data channel of the network-on-chip, the accelerator 221 may conveniently select among multiple second bridge points 223 to perform data interaction with different data storage areas through different second bridge points.

Further, the accelerator circuit 22 may include multiple accelerators 221. The multiple accelerators are respectively connected to the second bridge points through the data channels of the on-chip network.

The multiple accelerators 221 here may be accelerators that perform the same type of data processing, or may be accelerators that perform different types of data processing.

Compared with the embodiment shown in FIG. 1, in the on-chip integrated circuit according to this embodiment, multiple data storage areas and multiple first bridge points are arranged in the processor circuit, and multiple second bridge points are arranged in the accelerator circuit. When the accelerator is to access a data storage area, an optimal transmission path is determined, and information interaction is performed with the data storage area through the optimal data transmission path. This embodiment may be applied to scenarios of multiple data storage areas and/or multiple processors. In addition, the accelerator is connected to the processor circuit through multiple first bridge points, which can avoid channel congestion caused by accessing the processor circuit through a single access point, solving the problem of the quality of service caused by a large occupation of resources of the processor circuit.

Figure 3:
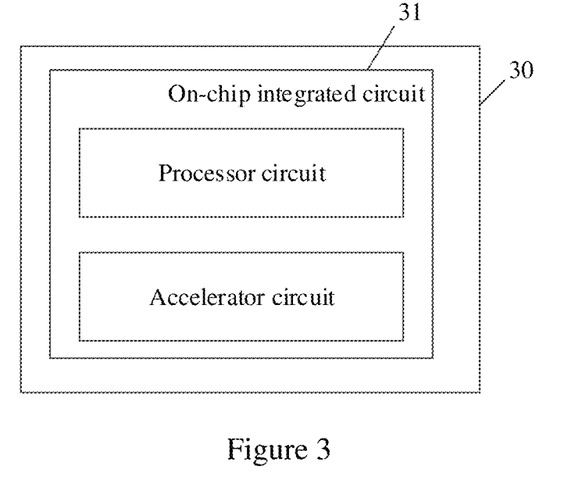
FIG. 3 is a schematic structural diagram of a data processing device according to an embodiment of the present disclosure.

Next, reference is made to FIG. 3, which is a schematic structural diagram of a data processing device according to an embodiment of the present disclosure. As shown in FIG. 3, a data processing device 30 includes an on-chip integrated circuit 31. The on-chip integrated circuit 31 includes a processor circuit and an accelerator circuit. The processor circuit includes a processor and a data storage area, and the processor is connected to the data storage area through a first bus arranged in the processor circuit. The accelerator circuit includes an accelerator and a second bus, the accelerator is connected to the second bus, and the second bus is bridged with a first bus corresponding to the data storage area to perform data interaction between the accelerator and the data storage area.

Figure 4:
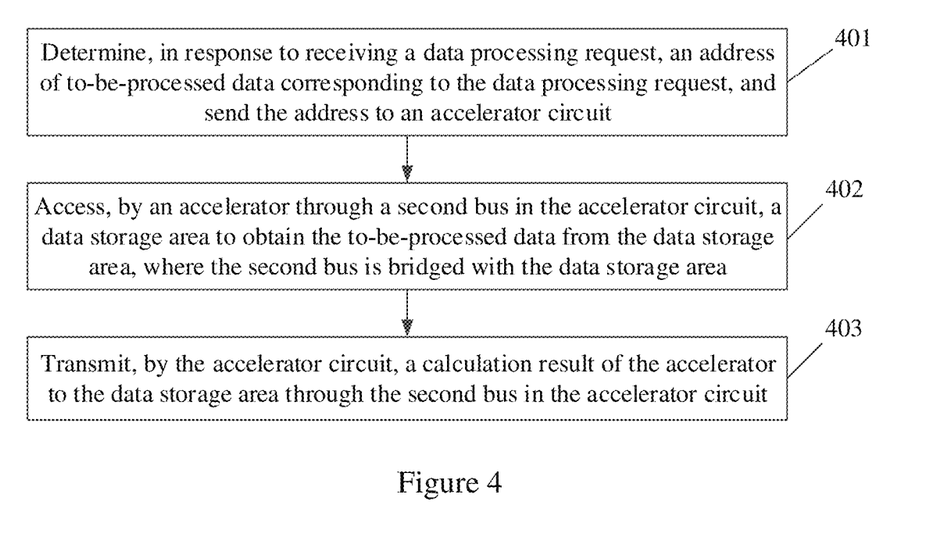
FIG. 4 is a schematic flowchart of a data processing method according to an embodiment of the present disclosure.

Next, reference is to FIG. 4, which is a schematic flowchart of a data processing method according to the present disclosure. The method is applied to the on-chip integrated circuit shown in FIG. 1. As shown in FIG. 4, the data processing method includes steps 401 to 403.

In step 401, in response to receiving a data processing request, an address of data to be processed corresponding to the data processing request is determined and is sent to the accelerator circuit.

The on-chip integrated circuit includes a processor circuit and an accelerator circuit. The processor circuit includes a processor and a data storage area, and the processor is connected to the data storage area through a first bus arranged in the processor circuit. The accelerator circuit includes an accelerator and a second bus, the accelerator is connected with the second bus, and the second bus is bridged with the first bus corresponding to the data storage area to perform data interaction between the accelerator and the data storage area.

In step 402, the accelerator accesses the data storage area through a second bus in the accelerator circuit to obtain the data to be processed from the data storage area, the second bus is bridged with the data storage area.

In step 403, the accelerator circuit transmits a calculation result of the accelerator to the data storage area through the second bus in the accelerator circuit.

In some alternative implementations, the processor circuit may include multiple data storage areas. Each data storage area includes a first bridge point. The accelerator circuit includes multiple second bridge points, there is a one-to-one correspondence between the first bridge points and the second bridge points, and the second bridge point is connected with a corresponding first bridge point through a second bus.

Each data storage area may be accessed by at least one processor.

Each data storage area has a storage area identifier.

In the application scenarios, the first bridge point has a first identifier, and the second bridge point has a second identifier. The first identifier of the first bridge point and the second identifier of the second bridge point connected to the first bridge point may be mapped to the storage area identifier of the data storage area corresponding to the first bridge point.

The accelerator circuit may include a positioning unit, and the positioning unit is configured to determine a target storage area identifier corresponding to the data to be processed according to the address of the data to be processed. In practice, the positioning unit may store a preset hash function. The positioning unit determines the target storage area identifier according to the address of the data to be processed by using a preset hash function, and determines the first target identifier and the second target identifier according to the target storage area identifier, to determine the target data storage area, the target first bridge point, and the target second bridge point. The accelerator may perform data interaction with the target data storage area by using the target first bridge point, the target second bridge point, and the second bus therebetween, to obtain the data to be processed from the target data storage area, or send a data processing result after processing the data to be processed to the target data storage area for storage.

The above merely describes preferred embodiments of the present disclosure and illustrates the technical principles employed. Those skilled in the art should understand that the scope of the present disclosure is not limited to the technical solutions formed by the specific combinations of the above-mentioned technical features, and should also cover, without departing from the disclosed concept, the technical solutions formed by any combinations of the above technical features and their equivalent features. For example, a technical solution is formed by replacing the above features with the technical features disclosed in the present disclosure (but not limited to) with similar functions.

Additionally, although operations are described in a particular order, this should not be construed as performing the operations in the particular order or in a sequential order. Under certain circumstances, multitasking and parallel processing may be advantageous. Likewise, although several implementation-specific details are included in the above description, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matters have been described in language specific to structural features and/or method logical acts, it is to be understood that the subject matters defined in the claims are not necessarily limited to the specific features or acts described above. Rather, the specific features and acts described above are merely example forms of implementing the claims.

The invention claimed is:

1. An on-chip integrated circuit, comprising: a processor circuit and an accelerator circuit, wherein
   the processor circuit comprises a processor and a data storage area, and the processor is connected to the data storage area through a first bus arranged in the processor circuit, and
   the accelerator circuit is configured to perform data interaction between an accelerator and the data storage area, and comprises the accelerator and a second bus, the accelerator is connected to the second bus, and the second bus is bridged with the first bus,
   wherein the data storage area is one of a plurality of data storage areas included in the processor circuit,
   the processor circuit further comprises a plurality of first bridge points, and there is a one-to-one correspondence between the data storage areas and the first bridge points,
   the accelerator circuit further comprises a plurality of second bridge points, and there is a one-to-one correspondence between the first bridge points and the second bridge points, and
   each of the second bridge points is connected to a corresponding first bridge point through the second bus.

2. The on-chip integrated circuit according to claim 1, wherein the processor circuit further comprises a plurality of processors, the plurality of data storage areas are connected through data channels provided by a first network-on-chip, and the first network-on-chip comprises the first bus.

3. The on-chip integrated circuit according to claim 1, wherein the data storage area has a storage area identifier, and
   the processor is configured to determine a target storage area identifier by using a first preset hash function, and perform data interaction with a target data storage area corresponding to the target storage area identifier through a data channel provided by a network-on-chip.

4. The on-chip integrated circuit according to claim 3, wherein the accelerator circuit further comprises a positioning unit,
   the positioning unit is configured to determine the target storage area identifier according to an address of data to be processed, and determine a target first bridge point and a target second bridge point according to the target storage area identifier; and the accelerator is configured to perform data interaction with the target storage area corresponding to the target storage area identifier through the target second bridge point, the target first bridge point and a second bus between the target second bridge point and the target first bridge point.

5. The on-chip integrated circuit according to claim 4, wherein a length of a target path for the accelerator to access the target data storage area through the target first bridge point and the target second bridge point is smaller than a length of a path for the accelerator to access the target data storage area through another first bridge point and another second bridge point.

6. The on-chip integrated circuit according to claim 4, wherein a time duration for the accelerator to access the target data storage area through the target first bridge point and the target second bridge point is shorter than a time duration for the accelerator to access the target data storage area through another first bridge point and another second bridge point.

7. The on-chip integrated circuit according to claim 4, wherein the accelerator circuit further comprises a second network-on-chip, the second network-on-chip comprises a plurality of second data channels, each of second bridge points is connected to one of the second data channels, and the second data channels are connected to the accelerator through a gate.

8. The on-chip integrated circuit according to claim 7, wherein the accelerator circuit comprises a plurality of accelerators, and each of the accelerators is connected to one of the second bridge points through a corresponding one of the second data channels of the second network-on-chip.

9. The on-chip integrated circuit according to claim 1, wherein the second bus comprises one of the following topologies: a ring topology, a mesh topology, and a star topology.

10. The on-chip integrated circuit according to claim 1, wherein the second bus comprises: a cache coherent bus or a non-cache coherent bus.

11. A data processing device, comprising an on-chip integrated circuit, wherein the on-chip integrated circuit comprises: a processor circuit and an accelerator circuit, and wherein the processor circuit comprises a processor and a data storage area, and the processor is connected to the data storage area through a first bus arranged in the processor circuit, and the accelerator circuit is configured to perform data interaction between an accelerator and the data storage area, and comprises the accelerator and a second bus, the accelerator is connected to the second bus, the second bus is bridged with the first bus, wherein the data storage area is one of a plurality of data storage areas included in the processor circuit, the processor circuit further comprises a plurality of first bridge points, and there is a one-to-one correspondence between the data storage areas and the first bridge points, the accelerator circuit further comprises a plurality of second bridge points, and there is a one-to-one correspondence between the first bridge points and the second bridge points, and each of the second bridge points is connected to a corresponding first bridge point through the second bus.

12. The data processing device according to claim 11, wherein the processor circuit further comprises a plurality of processors, the plurality of data storage areas are connected through data channels provided by a first network-on-chip, and the first network-on-chip comprises the first bus, channels are connected to the accelerator through a gate.

13. The data processing device according to claim 11, wherein the data storage area has a storage area identifier, and the processor is configured to determine a target storage area identifier by using a first preset hash function, and perform data interaction with a target data storage area corresponding to the target storage area identifier through a data channel provided by a network-on-chip.

14. The data processing device according to claim 13, wherein the accelerator circuit further comprises a positioning unit, the positioning unit is configured to determine the target storage area identifier according to an address of data to be processed, and determine a target first bridge point and a target second bridge point according to the target storage area identifier; and the accelerator is configured to perform data interaction with the target storage area corresponding to the target storage area identifier through the target second bridge point, the target first bridge point and a second bus between the target second bridge point and the target first bridge point.

15. The data processing device according to claim 14, wherein a length of a target path for the accelerator to access the target data storage area through the target first bridge point and the target second bridge point is smaller than a length of a path for the accelerator to access the target data storage area through another first bridge point and another second bridge point.

16. The data processing device according to claim 14, wherein a time duration for the accelerator to access the target data storage area through the target first bridge point and the target second bridge point is shorter than a time duration for the accelerator to access the target data storage area through another first bridge point and another second bridge point.

17. The data processing device according to claim 14, wherein the accelerator circuit further comprises a second network-on-chip, the second network-on-chip comprises a plurality of second data channels, each of second bridge points is connected to one of the second data channels, and the second data channels are connected to the accelerator through a gate.

18. A data processing method, applied to an on-chip integrated circuit, wherein the on-chip integrated circuit comprises: a processor circuit and an accelerator circuit, wherein the processor circuit comprises a processor and a data storage area, and the processor is connected to the data storage area through a first bus arranged in the processor circuit, the accelerator circuit comprises an accelerator and a second bus, the accelerator is connected to the second bus, the second bus is bridged with the first bus, wherein the data storage area is one of a plurality of data storage areas included in the processor circuit, the processor circuit further comprises a plurality of first bridge points, and there is a one-to-one correspondence between the data storage areas and the first bridge points, the accelerator circuit further comprises a plurality of second bridge points, and there is a one-to-one correspondence between the first bridge points and the second bridge points, and each of the second bridge points is connected to a corresponding first bridge point through the second bus,
wherein the data processing method comprises:
determining, in response to receiving a data processing request, an address of data to be processed corresponding to the data processing request;
sending the address to the accelerator circuit;
accessing, by the accelerator through the second bus in the accelerator circuit, the data storage area to obtain the data to be processed from the data storage area; and
transmitting, by the accelerator circuit, a calculation result of the accelerator to the data storage area through the second bus in the accelerator circuit.

* * * * *